Aug. 15, 1961 L. C. FOSTER 2,996,633

LOW INDUCTANCE SWITCH

Filed Feb. 13, 1958

Inventor
Leigh Curtis Foster
By Francis W. Crotty
Attorney

United States Patent Office 2,996,633
Patented Aug. 15, 1961

2,996,633

LOW INDUCTANCE SWITCH

Leigh Curtis Foster, Los Altos, Calif., assignor to Zenith Radio Corporation, a corporation of Delaware Filed Feb. 13, 1958, Ser. No. 715,000
6 Claims. (Cl. 313—7)

This invention pertains to switches, especially those of the arc-discharge type, for closing electrical circuits and is particularly directed to a switch which exhibits a very low inductance.

There are a great many electrical systems wherein low inductance components are required if the system is to achieve its intended result to the fullest extent. Systems of this type are usually characterized by a fast time constant, that is, they are required to deliver high peak currents for very brief time intervals which, of course, can be accomplished only if the circuit inductance is reduced to an essential minimum. The field of controlled thermonuclear reaction is one having such a characteristic.

It has been proposed that a controlled thermonuclear reaction may be attained by employing an exceedingly concentrated magnetic field fashioned to enclose a reaction space within which is contained a plasma of a suitable reactant. In pursuing this approach to controlled thermonuclear reaction, it is necessary to construct circuitry capable of supplying enormous quantities of energy in short pulse intervals in the order of 50 microseconds or less. Manifestly, specifications of this type can be met only through the use of "fast circuits" and the energy, which is usually derived from condenser banks, will have the steep waveform or fast-rise time required only if the inherent inductance of the power supply, including its condensers, is reduced to a minimum. Techniques have been perfected for minimizing lead inductance and condensers have been developed which exhibit an extraordinarily low internal inductance. Such a condenser is described and claimed in a copending application, Serial Number 711,376, filed January 27, 1958, in the name of Winfield W. Salisbury and assigned to the same assignee as the present invention. Where lead inductances and condenser inductances are thus minimized, the switch through which the condenser bank is discharged into the magnetic structure may become a principal contributor to the quantum of undesired inductance remaining in the system.

In past practices, the switch has taken the form of a pair of electrodes defining an air gap and arranged normally to support a potential difference at least equal to the voltage level of the condenser banks without suffering breakdown. A third electrode, usually referred to as a trigger, is associated with the gap electrodes and an exciting circuit applies a potential pulse to the trigger of sufficient intensity to break down the gap. Once the gap has broken down, the plasma atmosphere enclosing the principal gap electrodes supports current flow from the condenser banks to the magnetic structure. While such a switch has performed adequately, discharging currents of high intensity and relatively steep waveform from the condenser bank, it nevertheless exhibits more inductance than desired and an improvement in system performance can be realized by reducing its inductance to a minimum.

It is, therefore, an object of the invention to provide an electric switch of the arc-discharge type which exhibits low inductance, low in comparison with the inductance that such switches normally present.

It is a further object of the invention to provide a new and improved arc-discharge type of switch having a very low internal inductance.

A low inductance switch, constructed in accordance with the invention, comprises a chamber and a pair of electrodes are located in the chamber in space-opposed relation to define a spark gap therebetween. Means are provided for establishing a predetermined gas pressure condition within the chamber to permit the gap electrodes to sustain a desired potential difference without spark breakdown and further means are provided for the purpose of establishing another pressure condition in the chamber in the presence of which the potential difference between the electrodes effects a spark breakdown of the gas across the gap. Finally, the switch has conductive means connected to the electrodes for applying the desired potential difference thereto.

In a preferred embodiment, a vacuum pump is employed to draw a vacuum in the chamber of such level that the spark gap sustains a desired potential difference without breakdown and this vacuum is released when the switch is to be rendered conductive or closed perforce of a spark discharge between the electrodes. However, it is also known from Paschen's law that gap electrodes will sustain a desired potential difference in the presence of a high gas pressure, for example, a pressure of several atmospheres of hydrogen. Where the open condition of the switch is one in which there is such a high pressure established in the chamber, the closed condition is achieved by releasing the pressure to a level wherein the gap breaks down and conduction is completed between the electrodes by the discharge.

The features of the present invention which are believed to be novel are set forth with particularity in the appended claims. The organization and manner of operation of the invention, together with further objects and advantages thereof, may best be understood by reference to the following description taken in connection with the accompanying drawing in the several figures of which like reference numerals identify like elements, and in which:

Figures 1, 2:
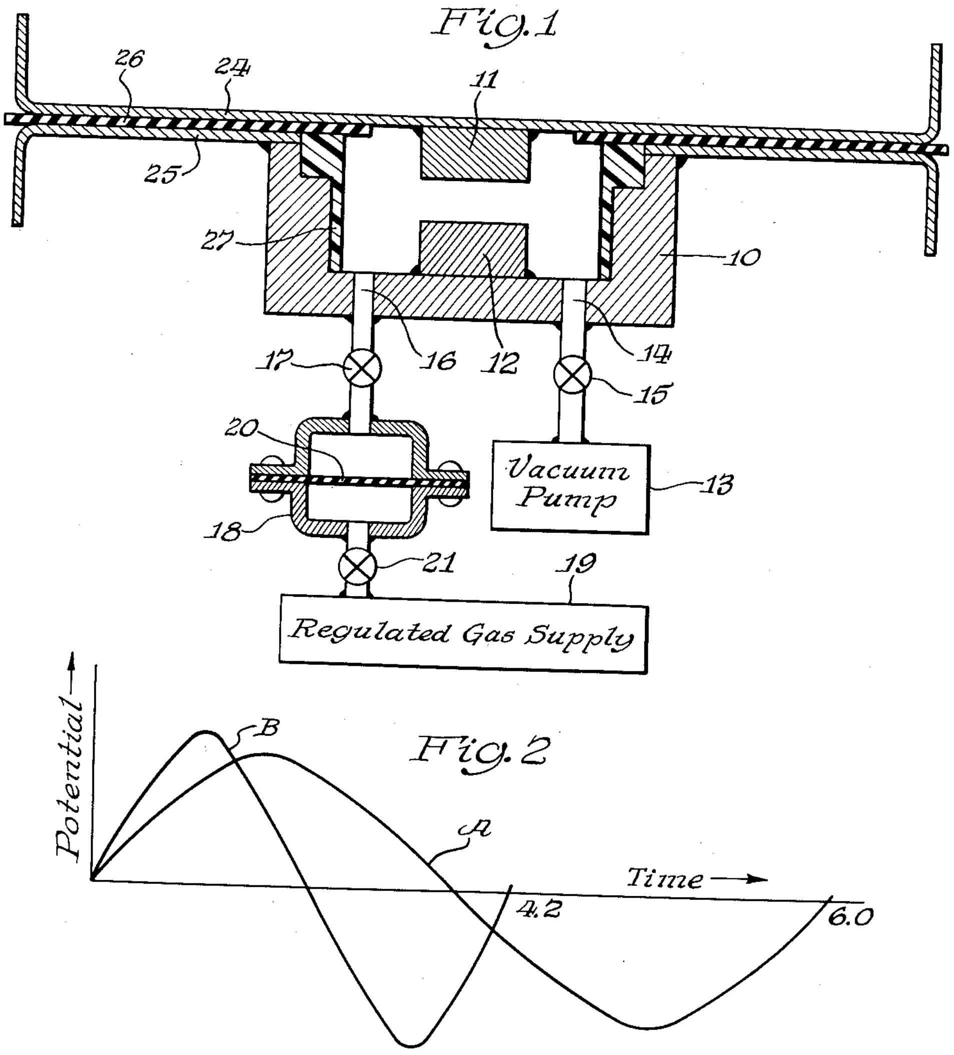
FIGURE 1 is a partially-schematic view of a low-inductance switch constructed in accordance with the teachings of the invention.
FIGURE 2 are curves utilized in explaining the speed of operation of the switch.

Referring now more particularly to FIGURE 1, the low-inductance switch there represented comprises a chamber 10 in the form of a hollow cylinder having sufficient wall thickness to withstand internal pressures incident to a system conducting currents of high intensity. The chamber is conductive and may be formed of a copper alloy. A pair of electrodes 11, 12 are supported in space-opposed relation within chamber 10 and define a spark gap. The electrodes are preferably constructed of tungsten or molybdenum and are annular in cross section. Their spacing, measured in the axial direction of chamber 10, is selected to the end that the gap which they define will support the voltage to be switched without breakdown when the pressure within the chamber has been established to a predetermined initial condition.

The means for establishing the desired gas pressure condition within the chamber is, of course, determined by the type operation contemplated; namely, whether a pressure below or above atmospheric is to be relied upon in permitting the gap electrodes to sustain the necessary potential difference without breakdown. As illustrated in the embodiment under consideration, a vacuum pump 13 is in communication with a port 14 of the chamber and a valve 15 is included in the conduit extending therebetween. Obviously, this arrangement is one in which a vacuum condition is initially established within the chamber and is maintained for the period in which the gap electrodes are to sustain a desired potential difference.

In order to break down the gap or, in effect, operate the switch, the arrangement under consideration has means for establishing another or different pressure condition in chamber 10 in the presence of which the potential difference of the gap electrodes effects a discharge across the gap. Where the initial condition is one of a vacuum, the gas pressure may be changed by admitting gas to the chamber. Any appropriate gas supply which is in communication with another port 16 of the chamber is suitable for this purpose and a valve 17 included in the gas conduit permits the rate of flow to be controlled. While such arrangement is perfectly feasible, it is preferred that a specific or measured amount of gas be allowed to enter chamber 10 at a preselected rate in order to change the pressure condition to one wherein the gap will break down. Accordingly, a pressure chamber 18 is interposed between a regulated gas supply 19 and valve 17. The pressure chamber has two complementary parts which are separable, one from the other by any suitable arrangement such as machine bolts and nuts accommodated by the flanged peripheries of these parts to facilitate their being detachably connected together. It is desirable to have the chamber made of separable parts in order to conveniently accommodate therein an expandable and replaceable pressure-sensitive device having a predetermined threshold level and normally interrupting communication between gas supply 19 and chamber 10. More particularly, the pressure-sensitive device may take the form of a diaphragm 20 stretched across chamber 18 and held in position by the engaging peripheries of the separable parts of that chamber. The diaphragm may be an aluminum foil which will rupture when subjected to a gas pressure in excess of a threshold level. That pressure will, of course, be a function of the strength of the diaphragm which, as indicated above, may conveniently be an aluminum foil. A valve 21 interposed between pressure chamber 18 and supply 19 controls the rate at which gas is admitted into the pressure chamber and the time required for a pressure sufficient to rupture the diaphragm to be built up in the chamber.

It is, of course, necessary to include conductive means connected to electrodes 11 and 12 for the purpose of applying a potential difference thereto. If these leads are not to deteriorate the desired low inductance characteristic of the switch, they must of themselves be low-inductance terminal strips. They are shown as two conductors 24 and 25, each of which is electrically connected to one of the electrodes so that a discharge across the gap effects an electrical interconnection from one conductor to the next whereas during operating intervals in which the gap is not broken down, there is no conductive path existing between the conductors. They are formed of strips of copper which have a width very much greater than their thickness and they are positioned in closely-opposed parallel-relation, being insulated from one another by a layer 26 of insulating material. Layer 26 is to have the smallest thickness compatible with electrical requirements to further minimize the inductance of the conductors.

Electrode 11 is both mechanically and electrically connected to conductor 24, being secured thereto by silver solder. Conductor 25 is connected to electrode 12 but through the intermediary of conductive chamber 10. Electrode 12 is silver-soldered to the base of this chamber. It is appropriate to include an insulating bushing 27 fitting closely to the inner contour of the vacuum chamber for the purpose of securing pressure-tight fits between the chamber and the leads or conductors 24, 25.

In using the described switch, vacuum chamber 10 is initially pumped down to a low pressure of the order of 5 microns of mercury and the switch is then coupled by means of its lead-ins 24, 25 across a high voltage source but in series with a current limiting resistor. Although the switch may not initially hold the desired voltage level without breakdown, in a short operating interval as the vacuum condition is maintained, the surfaces of the switch become baked out and the switch will then support a desired voltage gradient. The bake-out process is certainly to be continued to achieve a margin of safety, that is, to attain conditioning of the switch such that it can withstand a voltage comfortably in excess of that for which it is to be rated.

When the switch has been conditioned or baked out, it is then installed in the circuit in which it is to be employed, again through the agency of terminal strips 24, 25 and preferably while the vacuum is being maintained by pump 13. The circuit is then energized so that the voltage which is to be switched is applied across electrodes 11, 12.

When the desired vacuum level has been reached, valve 15 may be closed, preparatory to admitting gas to chamber 10 to actuate the switch. Valve 17 is set to permit a desired rate of flow of gas into chamber 10 following the rupturing of diaphragm 20 and valve 21 is operated almost closed to the end that it admits gas into chamber 18 at a very low rate to create a pressure at which diaphragm 20 bursts. When the diaphragm is ruptured, a measured quantity of gas is admitted to chamber 10 at the rate established by the setting of valve 17. One can consider a measured quantity of gas to be admitted into the chamber because, after the diaphragm has ruptured, only a very slight additional amount of gas is admitted to chamber 18 before the switch is closed because of the fact that valve 21 is operated nearly closed.

The gas admitted to chamber 10 destroys the vacuum and the amount admitted is that required to change the pressure condition in chamber 10 to one in the presence of which the potential difference across gap electrodes 11 and 12 effects a breakdown and thus actuation of the switch. Of course, where a diaphragm is employed as the pressure-sensitive element, it must be replaced after each actuation of the switch. If desired, a mechanical valve that is restrained against actuation until a threshold gas pressure builds up may be used in place of the diaphragm. This will be convenient in certain applications of the switch.

Curve A of FIGURE 2 represents a discharge of a condenser bank into a magnetic structure through a switch of the general type described but of the usual construction wherein the spark gap operates in air. One cycle of the discharge current, in a circuit installation employing such a conventional switch, occurred in 6 microseconds whereas the same installation, differing only in the substitution of the switch of FIGURE 1 for the conventional spark-gap-in-air-style switch, resulted in the response represented by curve B. The discharge cycle is seen to have been reduced from 6 to 4.2 microseconds when the switch was actuated by the admission of hydrogen gas to relieve an initial vacuum condition. In other words, there is a substantial improvement in inductance as comparative curves A and B demonstrate and, at the same time, there is an increase in the peak amplitude of the discharge current. If $R_1$ is considered to be the radius of the gap electrodes or the radius of the arc plasma and if $R_2$ is the effective internal radius of chamber 10, the inductance is minimized by making the switch as short as compatible with mechanical and electrical requirements and keeping the ratio of $R_2$ to $R_1$ as close to unity as possible.

One specific embodiment of the switch structure employed a vacuum chamber having an outside diameter of 1.5 inches and an internal diameter of ½ inch. The electrodes had a length of ¼ inch, a separation of ¼ inch and a diameter of ¼ inch. Diaphragm 20 consisted of three sheets of aluminum foil having a thickness of .00075 inch, and exposed area of ¾ square inch, and a rupture pressure of 15 p.s.i. The vacuum level was 5 microns of mercury in the presence of which the switch readily sustained a potential difference of 25 kilovolts and a break down resulted from the admission of hydrogen gas. The current capacity of the switch was $10^6$ amperes.

Figure 3:
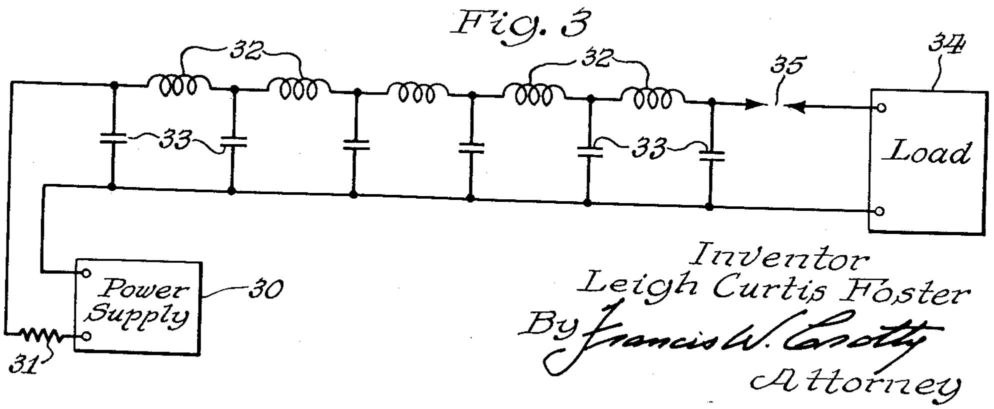
FIGURE 3 is a schematic representation of an electrical system to which the switch has unique application.

A low-inductance switch has a variety of useful applications, one of which is represented schematically in FIGURE 3. The arrangement there shown includes a power supply 30 which is coupled through a current-limiting resistor 31 to a network resembling an artificial transmission line. It has series-connected inductors 32, 32 and parallel condensers 33, 33. The output terminals of the line connect to a utilizing or load circuit 34 through a switch 35 represented symbolically but understood to be constructed in the manner of FIGURE 1. In this system, power supply 30 is a direct-current source which charges condensers 33, 33 through resistor 31 and, in that manner, stores energy in the network 33, 33. When switch 35 is actuated by breaking down the gap, as described in the discussion of FIGURE 1, the condensers discharge and deliver a pulse of energy to load 34. Where switch 35 is constructed in accordance with the present invention, it exhibits a minimum of internal inductance and, therefore, the pulse delivered to the load may have a steep wavefront or sharp risetime. That is to say, undesired inductance, which the conventional switch introduces into such a system with the effect of reducing the risetime, is here minimized.

In general, the breakdown of a spark gap in a gaseous atmoshpere creates a gas plasma and the described switch, wherein a gap breaks down in a gaseous atmosphere, lends itself to use as a high-current plasma source having a fast risetime. Plasmas are subject to the influence of magnetic forces and may be confined or compressed when subjected to magnetic fields so that the addition of a magnetic structure to chamber 10 may permit collimating of the plasma and, under controlled conditions, may even create neutrons. The magnetic forces and current conditions required for neutron generation are exceedingly high and, when the device is used as such a source, it is desirable to encase chamber 10 within a confining steel cylinder of sufficient mechanical strength to withstand the forces created.

The pressure chamber 18 and pressure-sensitive diaphragm 20 are particularly desirable when the described structure is employed as a neutron source. They are not required for most other installations because an adequate switch operation may be insured by changing the initial pressure conditions in chamber 10 without special regard for the amount of gas admitted for that purpose.

While particular embodiments of the invention have been described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A low-inductance switch comprising: a chamber; a pair of electrodes in space-opposed relation within said chamber defining a spark gap therebetween; means for establishing a predetermined gas pressure condition within said chamber to permit said gap electrodes to sustain a desired potential difference without spark breakdown; means for establishing another pressure condition in said chamber in the presence of which said potential difference effects a spark breakdown of said gas across said gap; and conductive means connected to said electrodes for applying said potential difference thereto.

2. A low-inductance switch comprising: a chamber; a pair of electrodes in space-opposed relation within said chamber defining a spark gap therebetween; means for establishing a predetermined vacuum condition within said chamber to permit said gap electrodes to sustain a desired potential difference without spark breakdown; means for admitting gas to said chamber to reduce said vacuum and establish a pressure condition in said chamber in the presence of which said potential difference effects a spark breakdown of said gas across said gap; and conductive means of low internal inductance connected to said electrodes for applying said potential difference thereto.

3. A low-inductance switch comprising: a vacuum chamber; a pair of electrodes in space-opposed relation within said chamber defining a spark gap therebetween; means for establishing a predetermined vacuum condition within said chamber to permit said gap electrodes to sustain a desired potential difference without breakdown; a pressure chamber; means for coupling said pressure chamber to said vacuum chamber including a pressure-sensitive device having a predetermined threshold and normally interrupting communication between said chambers; means for supplying gas to said pressure chamber to actuate said device and admit gas to said vacuum chamber to reduce the vacuum therein and establish a pressure condition in the presence of which said potential difference effects a discharge across said gap; and conductive means of low internal inductance connected to said electrodes for applying said potential difference thereto.

4. A low-inductance switch comprising: a vacuum chamber; a pair of electrodes in space-opposed relation within said chamber defining a spark gap therebetween; means for establishing a predetermined vacuum condition within said chamber to permit said gap electrodes to sustain a desired potential difference without breakdown; a pressure chamber including a diaphragm subject to rupturing at a predetermined threshold pressure and normally interrupting communication between said chambers; means for supplying gas to said pressure chamber to develop a pressure exceeding said threshold to rupture said diaphragm and admit gas to said vacuum chamber and to reduce the vacuum therein and establish a pressure condition in the presence of which said potential difference effects a discharge across said gap; and conductive means of low internal inductance connected to said electrodes for applying said potential difference thereto.

5. A low-inductance switch comprising: a chamber; a pair of electrodes in space-opposed relation within said chamber defining a spark gap therebetween; means for establishing a predetermined gas pressure condition within said chamber to permit said gap electrodes to sustain a desired potential difference without breakdown; means for establishing another pressure condition in said chamber in the presence of which said potential difference effects a discharge across said gap; and a pair of conductors formed of sheet material having a width very large compared to its thickness, said conductors having pressure-sealed connections with said chamber and each being electrically connected to an assigned one of said electrodes to that a discharge across said gap effects an electrical connection from one of said conductors to the other.

6. A low-inductance switch comprising: a chamber having an effective internal radius $R_1$; a pair of electrodes in space-opposed relation within said chamber defining a spark gap therebetween and having an effective radius $R_2$ such that the radius $R_2$ to $R_1$ is close to unity; means for establishing a predetermined gas pressure condition within said chamber to permit said gap electrodes to sustain a desired potential difference without breakdown; means for establishing another pressure condition in said chamber in the presence of which said potential difference effects a discharge across said gap; and conductive means connected to said electrodes for applying said potential difference thereto.

References Cited in the file of this patent

UNITED STATES PATENTS 2,591,485 White ---------------- Apr. 1, 1952